(12) United States Patent
Burrow et al.

(10) Patent No.: US 10,996,121 B2
(45) Date of Patent: *May 4, 2021

(54) AXIAL FORCE PRESSURE TRANSDUCER

(71) Applicant: Interface, Inc., Scottsdale, AZ (US)

(72) Inventors: Lawrence J. Burrow, Scottsdale, AZ (US); LaVar Clegg, Scottsdale, AZ (US); Robert T. Fuge, Scottsdale, AZ (US); Brock Palmer, Scottsdale, AZ (US)

(73) Assignee: Interface, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/693,728

(22) Filed: Nov. 25, 2019

(65) Prior Publication Data

US 2020/0088592 A1 Mar. 19, 2020

Related U.S. Application Data

(63) Continuation of application No. 16/055,714, filed on Aug. 6, 2018, now Pat. No. 10,488,281.

(60) Provisional application No. 62/541,700, filed on Aug. 5, 2017.

(51) Int. Cl.
*G01L 3/12* (2006.01)
*G01L 1/22* (2006.01)
*G01G 3/12* (2006.01)
*G01G 3/14* (2006.01)
*G01L 5/1627* (2020.01)

(52) U.S. Cl.
CPC .............. *G01L 1/2206* (2013.01); *G01G 3/12* (2013.01); *G01G 3/14* (2013.01); *G01L 1/2262* (2013.01); *G01L 5/1627* (2020.01); *G01L 1/2281* (2013.01)

(58) Field of Classification Search
CPC ..... G01L 1/2206; G01L 1/2262; G01L 5/161; G01L 1/2281; G01G 3/12; G01G 3/14
USPC ....................................................... 73/862, 45
See application file for complete search history.

(56) References Cited

U.S. PATENT DOCUMENTS

| | | | | |
|---|---|---|---|---|
| 2,620,381 A | * | 12/1952 | Mayes ................... | G01R 33/04 324/255 |
| 4,111,052 A | * | 9/1978 | Sniderman ............... | G07C 9/35 73/862.541 |
| 4,454,769 A | * | 6/1984 | Loos ...................... | G01L 1/2262 73/862.041 |
| 4,555,955 A | * | 12/1985 | Morgan ............. | B23Q 17/0966 73/794 |
| 4,833,926 A | * | 5/1989 | Todoroki ................ | G01L 3/102 73/862.041 |
| 5,490,427 A | * | 2/1996 | Yee ......................... | G01L 5/161 73/767 |

(Continued)

*Primary Examiner* — Max H Noori
(74) *Attorney, Agent, or Firm* — Spencer Fane LLP; Steven J. Laureanti (57) ABSTRACT

A system and method configured to measure applied force and pressure on a load cell. The system includes an axial force pressure transducer having a hollow cross section comprising at least two strain sensitive regions, and a plurality of strain sensors connected to the at least two strain sensitive regions, wherein applied force and pressure is calculated based on strain measurements using mathematical formulae. A method of calibration of the axial force pressure transducer using known applied force and pressure measurements to calculate a calibration matrix reflecting the strain sensitivities of the at least two strain sensitive regions.

20 Claims, 4 Drawing Sheets (56) References Cited

U.S. PATENT DOCUMENTS

| | | | | |
|---|---|---|---|---|
| 5,969,919 A | * | 10/1999 | Kobayashi | B62D 5/0484 318/281 |
| 2019/0154526 A1 | * | 5/2019 | Burrow | G01G 3/14 |

* cited by examiner

AXIAL FORCE PRESSURE TRANSDUCER

CROSS-REFERENCE TO RELATED APPLICATIONS

This application is a continuation of U.S. patent application Ser. No. 16/055,714, filed on Aug. 6, 2018, entitled "Axial Force Pressure Transducer," which claims the benefit under 35 U.S.C. § 119(e) to U.S. Provisional Application No. 62/541,700, filed Aug. 5, 2017, and entitled "Axial Force Pressure Transducer." U.S. patent application Ser. No. 16/055,714 and U.S. Provisional Application No. 62/541,700 are assigned to the assignee of the present application. The subject matter disclosed in U.S. patent application Ser. No. 16/055,714 and U.S. Provisional Application No. 62/541,700 is hereby incorporated by reference into the present disclosure as if fully set forth herein.

TECHNICAL FIELD

This disclosure relates generally to systems and methods for force or pressure measurements, and more specifically to an axial force and pressure transducer.

BACKGROUND

A typical load cell may be made from a single hollow column with sensors disposed upon its interior. This design concept is widely used for force measurement and works well except when the load cell may be subjected to externally applied pressures. Compensation for external pressure is problematic and complex in its implementation. This may lead to inaccuracies in the measurements made with such an arrangement. Strain gages may be applied to either the inside or the outside of the hollow column with equal success. An array of strain gages that measure both the axial component of strain and the Poisson effect 90 degrees to the axial component are typically used. Strain measurement gage pairs are usually placed equally spaced about the central axis of the hollow column.

The typical hollow column design suffers because, if the inner or outer portions of the column are subjected to pressure, the force measurement is affected by the pressure, as it is affected by axial force. Force and pressure measurements cannot readily be separated from each other. There are known systems that describe how to make this type of load cell by gage placement or electrical modification of a Wheatstone bridge insensitive to the pressure applied. However, with the known systems there may be limitations to the usage of their teachings due to the complexity of compensation techniques involved.

Sometimes hollow column load cells are also strain gauged to measure other physical forces being applied to the transducer. A good example of this is a multiplicity of strain gages placed 45 degrees to the axial axis of the transducer to measure torque being applied to the body of the transducer. This measurement is inherently insensitive to the pressure and axial force applied but the torque measurement can be improved by knowing the axial force and pressure applied and can be used to mathematically improve the accuracy of the torque measurement.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In embodiments of the disclosed subject matter, the unique systems and methods described herein make use of an exemplary stepped coaxial cylinder design ("two or more cross sections") to improve measurement accuracy in the presence of external pressure, or the like.

In embodiments of the disclosed subject matter, the system and method described herein can extend far beyond the field of load cell design. The system and method can be applied anywhere a force and or pressure measurement can be made. Anywhere a strain measurement can be made by utilizing this method of measuring stresses or strains on varying cross sections, a solution for both the force and pressure can be extracted from the system, by the methods described herein.

In embodiments of the disclosed subject matter, the system described herein is unique in that it is not a method for making the load cell insensitive to pressure through complex techniques. In embodiment of the disclosed subject matter, accuracy may be improved through a unique geometry change in the unique system design, and the resulting mathematical expressions which allow the load cell to measure both pressure and axial force simultaneously and accurately without complex compensation techniques. Applying strain sensors to two or more cross sections and using the signals obtained from the two or more cross sections allows the measurement of both force and pressure to be determined through the use of a mathematical process.

In an embodiment of the disclosed subject matter, a system for measuring force and pressure comprises a hollow cross section having at least two strain sensitive regions, a plurality of strain sensors connected to the at least two strain sensitive regions, and a processor configured to calculate applied force and pressure based on the output of the strain sensor using a calibration matrix.

In an embodiment of the disclosed subject matter, the hollow cross section comprises two cylindrically-shaped strain sensitive regions, and a transition region connected between the strain sensitive regions in order to reduce the effect of strain spikes within the strain sensitive regions. The strain sensors comprise a plurality of strain gages configured to measure axial strain and circumferential strain of the strain sensitive regions. The strain sensors connected to the exterior or interior of the strain sensitive regions, and connected to opposite sides of each of the strain sensitive regions.

In an embodiment of the disclosed subject matter, the system for measuring force and pressure may further comprise an electrical circuit having a first bridge and a second bridge; wherein a first set of strain sensors configured for electrical communication with the first bridge; and wherein a second set of strain sensors configured for electrical communication with the second bridge. The system may further comprise a processor configured to calculate a force and a pressure applied to the hollow cross section using an output signal from each the first bridge and the second bridge in accordance with mathematical equations utilizing constants or a calibration matrix based on properties of the strain sensitive regions.

These and other features of the disclosed subject matter are described in greater detail below.

BRIEF DESCRIPTION OF THE DRAWINGS

The drawings constitute a part of this specification and include exemplary embodiments of the disclosed subject matter and illustrate various objects and features thereof. In the figures, like reference numbers refer to like elements or acts throughout the figures.

DETAILED DESCRIPTION

As required, detailed aspects of the disclosed subject matter are disclosed herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure.

Certain terminology will be used in the following description, and are shown in the drawings, and will not be limiting. For example, up, down, front, back, right and left refer to the disclosed subject matter as orientated in the view being referred to. The words, "inwardly" and "outwardly" refer to directions toward and away from, respectively, the geometric center of the aspect being described and designated parts thereof. The words "interior" and "exterior" are refer to positions situated inside or outside, respectively, of the aspect being described or designated parts thereof. Said terminology will include the words specifically mentioned, derivatives thereof, and words of similar meaning.

The examples below describe an axial force pressure transducer and method of use. Although the present examples are described and illustrated herein as being implemented in an axial force pressure transducer, the transducer described is provided as an example and not a limitation. As those skilled in the art will appreciate, the present examples are suitable for application in a variety of different types of force or pressure measurement systems.

The system described herein is unique in that it is not a method for making the load cell insensitive to pressure through complex techniques. In this invention, accuracy may be improved through a unique geometry changes in the load cell design, and the resulting mathematical expressions which allow calculation of both pressure and axial force on the load cell simultaneously and accurately without complex compensation. Applying strain sensors to two or more cross sections of the load cell and using the signals obtained from the strain sensors allows the measurement of both pressure and force to be determined through the use of mathematical formulae.

The stresses and strains on the regions of the load cell are proportional to the cross sectional area of each region. Stresses or strains produced from internal or external pressure are effectively proportional to the thickness of the cross section. This allows the pressure sensitivity to express itself at a different rate than the stresses and strains produced by force.

Figure 1:
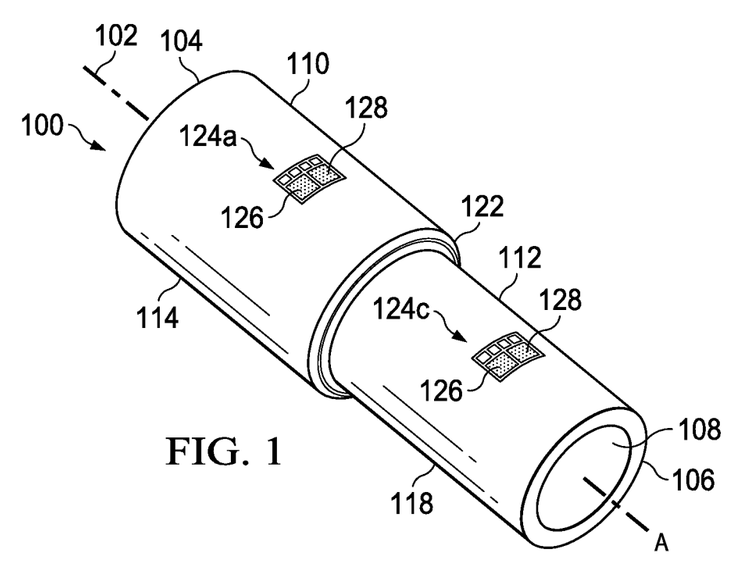
FIG. 1 is an isometric view of a hollow cross section, according to a first embodiment.
Figure 2:
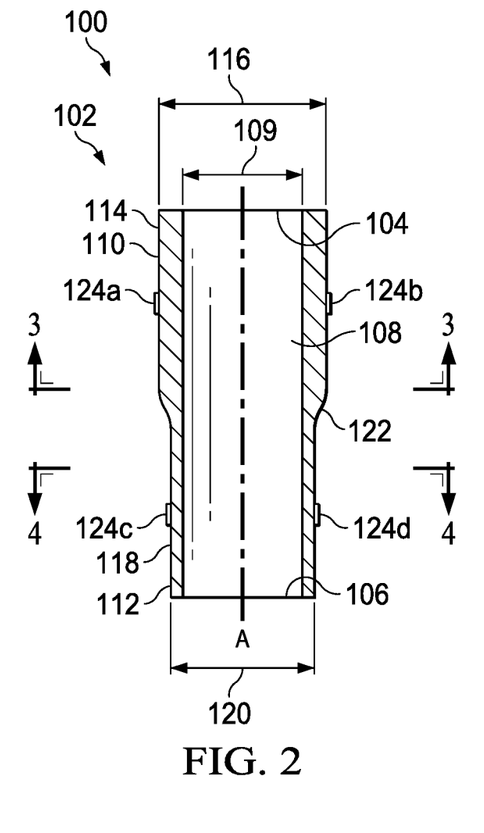
FIG. 2 is sectional view of a hollow cross section, according to an embodiment.

Referring to FIGS. 1-2, an axial force pressure transducer 100 comprises a hollow cross section 102 having a first end 104, a second end 106, and a hole 108 centrally bored along a central axis A of the hollow cross section 102; the hole is configured to provide a constant interior diameter 109 within the hollow cross section 102. The first end 104 and second end 106 are configured to receive and apply a load to the hollow cross section 102. The hollow cross section 102 generally comprises two strain sensitive regions 110,112; wherein the first strain sensitive region 110 is defined by a first cylinder 114 having a first outside diameter 116; and wherein the second strain sensitive region 112 is defined by a second cylinder 118 having a second outside diameter 120. The first outside diameter 116 is greater than the second outside diameter 120, whereby the different cross sections of the hollow cross section 102 produces unique strain sensitivities within the first strain sensitive region 110 and second strain sensitive region 112. In some embodiments, the hole 108 within the first strain sensitive region is not the same diameter as the hole 108 within the second strain sensitive region 112. The hollow cross section 102 is dimensioned to account for the anticipated pressure and force to be measured along with the material of construction. Larger anticipated pressure will require thicker walls of the hollow cross section 102. Larger anticipated forces will require more cross sectional area of the hollow cross section 102. The hole 108 may be dimensioned to accommodate the installation and access of strain sensors. Strain sensitive regions 110, 112 are configured to maximize the difference in pressure and force sensitivities of the strain sensitive regions 110, 112.

A transition region 122 is connected between the first cylinder 114 and the second cylinder 118. The outside diameter of the transition region 118 gradually tapers or curves between the first cylinder 114 and second cylinder 116; whereby strain spikes are reduced between the first strain sensitive region 110 and second strain sensitive region 112. In some embodiments, the first strain sensitive region 110 abruptly transitions to the second strain sensitive region 112.

In some embodiments, the exterior and interior of the cross section of the strain sensitive regions may take various geometric shapes such as, by way as example, a square, a hexagon, or a triangle; provided the cross section remains sensitive to both force and pressure.

The axial force pressure transducer 100 structure is shown formed of a single body of resilient material, typically a steel alloy, a Nickel alloy, a titanium alloy, or an aluminum alloy. The components of the axial force pressure transducer 100 structure are formed by conventional machining techniques. As shown, the structure is generally cylindrical and symmetrical about a central axis A having at least two distinct cross sections of different thicknesses. The axial force pressure transducer 100 structure may comprise more than two distinct cross sections. In some embodiments, the first end 104 and second end 106 may be either open or closed depending on the application of the axial force pressure transducer 100.

Figure 3:
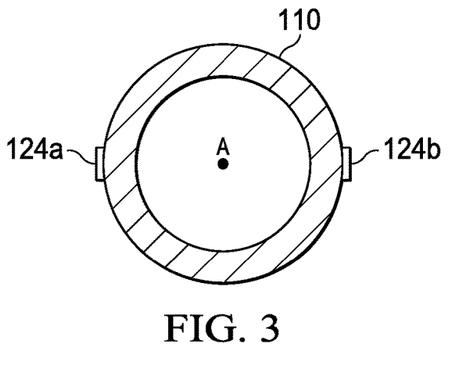
FIG. 3 is sectional view of a first strain sensitive region having strain sensors disposed on the exterior of the hollow cross section, according to an embodiment.
Figure 4:
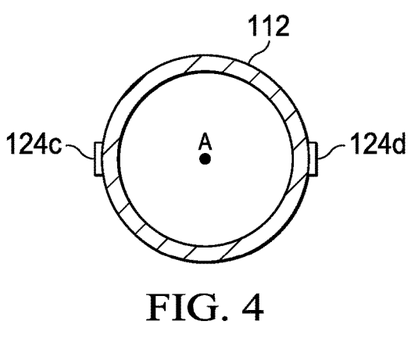
FIG. 4 is sectional view of a second strain sensitive region having strain sensors disposed on the exterior of the hollow cross section, according to an embodiment.
Figure 5:
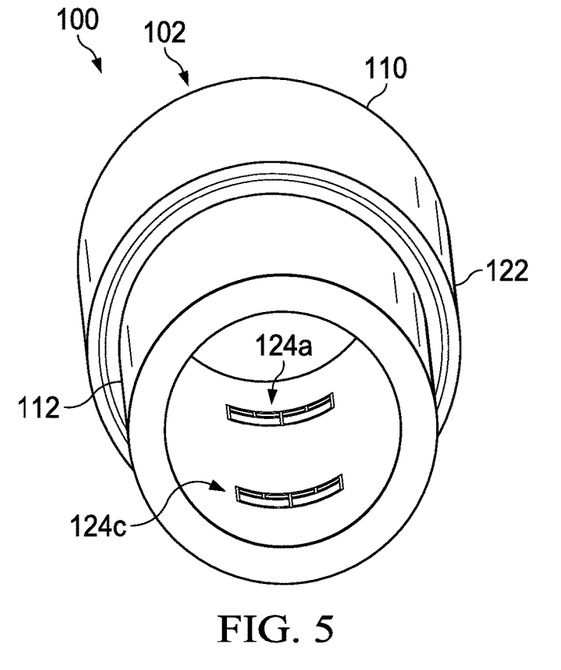
FIG. 5 is an isometric view of a hollow cross section having strain sensors disposed on the interior of the hollow cross section, according to an embodiment.
Figure 6:
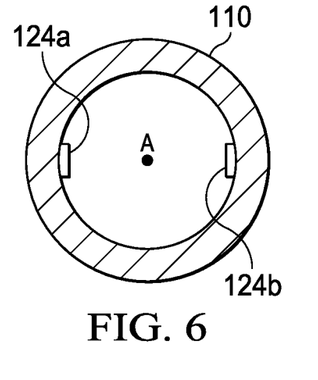
FIG. 6 is sectional view of a first strain sensitive region having strain sensors disposed on the interior of the hollow cross section, according to an embodiment.
Figure 7:
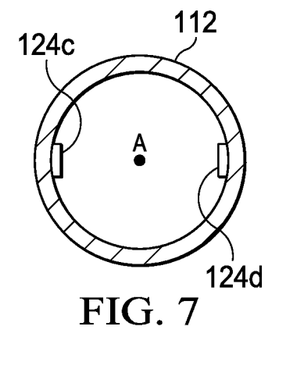
FIG. 7 is sectional view of a second strain sensitive region having strain sensors disposed on the interior of the hollow cross section, according to an embodiment.

Referring to FIG. 1-2, the strain sensors 124a-d are securely affixed to the hollow cross section 102; wherein each strain sensor comprises an axial strain gage 126 configured to measure strain along the central axis A, and a circumferential strain gage 128 configured to measure strain 90 degrees from the central axis A. The strain sensors may be affixed to either the interior of the hollow cross section 102 (as shown in FIGS. 1-4), the exterior of the hollow cross section 102 (as shown in FIGS. 5-7), or to both the interior and exterior of the hollow cross section 102. The strain gages 126, 128 may include, by way of example, foil strain gages, semiconductor strain gages, optical strain gages, or deposited strain gages.

Referring to FIGS. 1-4, in an embodiment of the disclosed subject matter, four strain sensors 124a-d are affixed to the exterior of the hollow cross section 102; wherein strain sensor 124a is affixed to the exterior side of first strain sensitive region 110, strain sensor 124b is affixed on the opposite exterior side of the first strain sensitive region 110 at 180 degrees from strain sensor 124a, strain sensor 124c is affixed to the exterior side of second strain sensitive region 112, and strain sensor 124d is affixed on the opposite exterior side of the second strain sensitive region 112 at 180 degrees from strain sensor 124c. Strain sensors 124a and 124c are aligned along a projection of the central axis A on the hollow cross section 102.

The strains sensors 124a and 124b are positioned on the first strain sensitive region 112 approximately near the center of the first strain sensitive region 110 in order to avoid the influence of strain spikes near the first end 104 and the transition region 122. Similarly, the strains sensors 124c and 124d are positioned on the second strain sensitive region 112 approximately near the center of the second strain sensitive region 112 in order to avoid the influence of strain spike near the second end 106 and the transition region 122.

Referring to FIGS. 5-7, in another embodiment of the disclosed subject matter, the four strain sensors 124a-d may alternatively be affixed to the interior diameter of the hollow cross section; wherein strain sensor 124a is affixed to the interior side of first strain sensitive region 110, strain sensor 124b is affixed on the opposite interior side of the first strain sensitive region 110 at 180 degrees from strain sensor 124a, strain sensor 124c is affixed to the interior side of second strain sensitive region 112, and strain sensor 124d is affixed on the opposite interior side of the second strain sensitive region 112 at 180 degrees from strain sensor 124c. Strain sensors 124a and 124c are aligned along a projection of the central axis A on the hollow cross section 102. Additional strain sensors may be affixed to the hollow cross section 102 to provide addition strain detection in any direction. These additional directions may be used for measuring torque, moment, or side loads, applied to the transducer 100.

Figure 8:
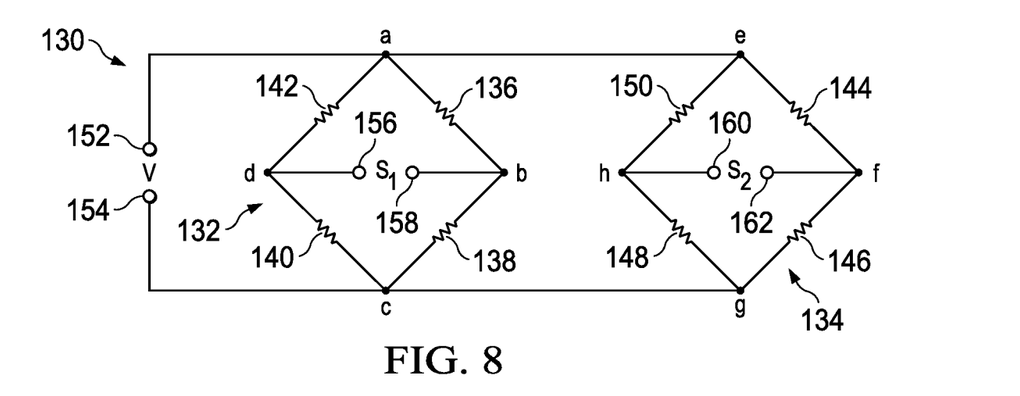
FIG. 8 is a wiring diagram of a bridge circuit embodying the strain gages and is useful in the connection of the load cell as illustrated in FIGS. 1-6, according to an embodiment.

A bridge circuit embodying the strain gages as illustrated in FIGS. 1-7 is shown in FIG. 8. The strain gages are electrically configured into two Wheatstone bridges that would each have signals that are proportional to both force and pressure. The electrical circuit generally denoted by the numeral 130 is the nature of two Wheatstone bridges (a first bridge 132 and a second bridge 134) electrically connected in a parallel circuit. The first bridge 132 has four junctions a, b, c, and d with the individual legs of the bridge connected to form in essence a circuit to measure voltage (Wheatstone bridge). Second bridge 134 has four junctions e, f, g, and h with the individual legs of the bridge connected to form in essence a closed loop. More specifically, the circumferential strain gage of strain sensor 124a is connected between the junctions a-b as denoted as numeral 136, the axial strain gage of strain sensor 124a is connected between the junctions b-c as denoted by numeral 138, the circumferential strain gage of strain sensor 124b is connected between the junctions c-d as denoted as numeral 140, the axial strain gage of strain sensor 124b is connected between the junctions d-a as denoted by numeral 142, the circumferential strain gage of strain sensor 124c is connected between the junctions e-f as denoted as numeral 144, the axial strain gage of strain sensor 124c is connected between the junctions f-g as denoted by numeral 146, the circumferential strain gage of strain sensor 124d is connected between the junctions g-h as denoted as numeral 148, the axial strain gage of strain sensor 124d is connected between the junctions h-e as denoted by numeral 150. For clarity, strain gages 136, 138, 140, 142, 144, 146, 148 and 150 are indicated as resistance elements. An energizing voltage V is applied to terminals 152 and 154 which are connected to junctions a and c respectively. Junctions a and e are electrically connected, and junctions c and g are electrically connected, to form a parallel circuit between terminals 152 and 154. An output signal $S_1$ from the first bridge is obtained from terminals 156 and 158, while an output signal $S_2$ from the second bridge obtained from terminals 160 and 162.

A processor may be configured to calculate a force and pressure based on the output signals $S_1, S_2$ from the first bridge and the second bridge respectively in accordance with mathematical equations.

The axial gages react to the force component directly and the circumferential gages arranged 90 degrees to the axial gages react to the force by virtue of Poisson's ratio. With force only these strains are of opposite direction which is what drives the differential voltage measurement within the Wheatstone bridge. When only pressure is applied to the internal diameter the circumferential gage and axial gage react with strain in the same direction.

By virtue of the stepped mechanical configuration, each cross section of each strain sensitive region has a different sensitivity to force F and pressure P. By virtue of a calibration procedure these different sensitivities can be measured under various loading conditions and from that calibration, a transfer function that calculates force and pressure simultaneously can be developed.

In the simplest form, the transfer function takes on the form:

$$F = C1 \times S_1 + C2 \times S_2 \quad (1)$$

$$P = C3 \times S_1 + C4 \times S_2 \quad (2)$$

where F is force, P is pressure, $S_1$ is the output signal of the first bridge 132, $S_2$ is the output signal of the second bridge 134, and C1 through C4 are constants based on properties of the strain sensitive regions determined through calibration during construction of the transducer 100.

More specifically, and referring to FIG. 8, in an embodiment of the disclosed subject matter, a method of calibration of the axial force pressure transducer comprises the steps of: (1) applying a first force $F_1$ to the load cell with no change in pressure; (2) measuring the output signals $S_1$ and $S_2$ from the bridges 132 and 134 respectively; (3) applying a second force $F_2$ to the load cell—with no change in pressure; (4) measuring the output signals $S_3$ and $S_4$ from the bridges 132 and 134 respectively; (5) calculating a ratio of changes in the output signal with respect to changes in the applied force in accordance with the following equations:

$$\frac{S3-S1}{F2-F1} = \frac{\partial Sig1}{\partial F} \quad (3)$$

$$\frac{S4-S2}{F2-F1} = \frac{\partial Sig2}{\partial F} \quad (4)$$

The method of calibration further comprises the steps of: (6) applying a first pressure $P_1$ to the load cell while no force is applied to the load cell; (7) measuring the output signals $S_5$ and $S_6$ from the bridges 132 and 134 respectively; (8) applying a second pressure $P_2$ to the load cell while no force is applied to the load cell; (9) measuring the output signals S7 and $S_5$ from the bridges 132 and 134 respectively; (10) calculating a ratio of changes in the output signal with respect to changes in the applied pressure in accordance with the following equations:

$$\frac{S7-S5}{P2-P1} = \frac{\partial Sig1}{\partial p} \quad (5)$$

$$\frac{S8-S6}{P2-P1} = \frac{\partial Sig2}{\partial p} \quad (6)$$

The method of calibration further comprises the step of (11) expressing equations 3-6 in accordance with the following sensitivity matrix which represent the unique strain sensitivities of the hollow cross sections:

$$\begin{bmatrix} \frac{\partial Sig1}{\partial F} & \frac{\partial Sig2}{\partial F} \\ \frac{\partial Sig1}{\partial p} & \frac{\partial Sig2}{\partial p} \end{bmatrix} \text{Sensitivity Matrix} \quad (7)$$

The method of calibration further comprises the step of (12) inverting the matrix (7) to calculate a calibration matrix that represents the change in force and pressure required to produce the change in signal observed in the hollow cross section configuration:

$$\begin{bmatrix} \frac{\partial Sig1}{\partial F} & \frac{\partial Sig2}{\partial F} \\ \frac{\partial Sig1}{\partial p} & \frac{\partial Sig2}{\partial p} \end{bmatrix}^{-1} = \begin{bmatrix} \frac{\partial F}{\partial Sig1} & \frac{\partial F}{\partial Sig2} \\ \frac{\partial p}{\partial Sig1} & \frac{\partial p}{\partial Sig2} \end{bmatrix} \text{Calibration Matrix} \quad (8)$$

The calibration matrix may be used to calculate a change in force $\Delta F$ and a change in pressure $\Delta P$ applied to load cell in accordance with the following formula:

$$\begin{bmatrix} \frac{\partial F}{\partial Sig1} & \frac{\partial F}{\partial Sig2} \\ \frac{\partial P}{\partial Sig1} & \frac{\partial P}{\partial Sig2} \end{bmatrix} \cdot \begin{bmatrix} \Delta S_1 \\ \Delta S_2 \end{bmatrix} = \begin{bmatrix} \Delta F \\ \Delta P \end{bmatrix} \quad (9)$$

where $\Delta S_1$ is the change in output signal of the first bridge 132, $\Delta S_2$ the change in output signal of the second bridge 134, $\Delta F$ is the change in force applied to the load cell, and $\Delta P$ is the change in pressure applied to the load cell. Output signals $S_1$-$S_4$ may be approximately trimmed, or tarred, to zero when no force and/or pressure is applied to the load cell; wherein a measurement of the change in force ($\Delta F$) is the actual force applied to the load cell, and/or a measurement of the change in pressure ($\Delta P$) is the actual pressure applied to the load cell.

In another aspect of the disclosed subject matter, the method of axial force pressure transducer measurement may comprise, if pressure is known, calculations for force may be applied to the output signals of the first bridge and second bridge to calculate actual applied force. Similarly, the method of axial force pressure transducer measurement may comprise, if force is known, calculations for pressure may be applied to the output signals of the first bridge and second bridge to calculate actual applied pressure.

In another aspect of the disclosed subject matter, the method of axial force pressure transducer measurement may comprise the application of temperature measurements; the temperature measurements may add to the accuracy of the calculation of force and pressure by canceling out any temperature sensitivities of a measurement system. The use of temperature measurements, combined with data analysis techniques, may apply to either scaling or zero offset errors.

In another aspect of the disclosed subject matter, the method of axial force pressure transducer measurement may comprise additional bridge measurements from additional force sensors to the cross sections which allow further refinement of the force and pressure measurements. The additional bridge measurements may measure torque or moments applied to the cross sections which would add to the total accuracy and functionality of the axial force pressure transducer.

Figure 9:
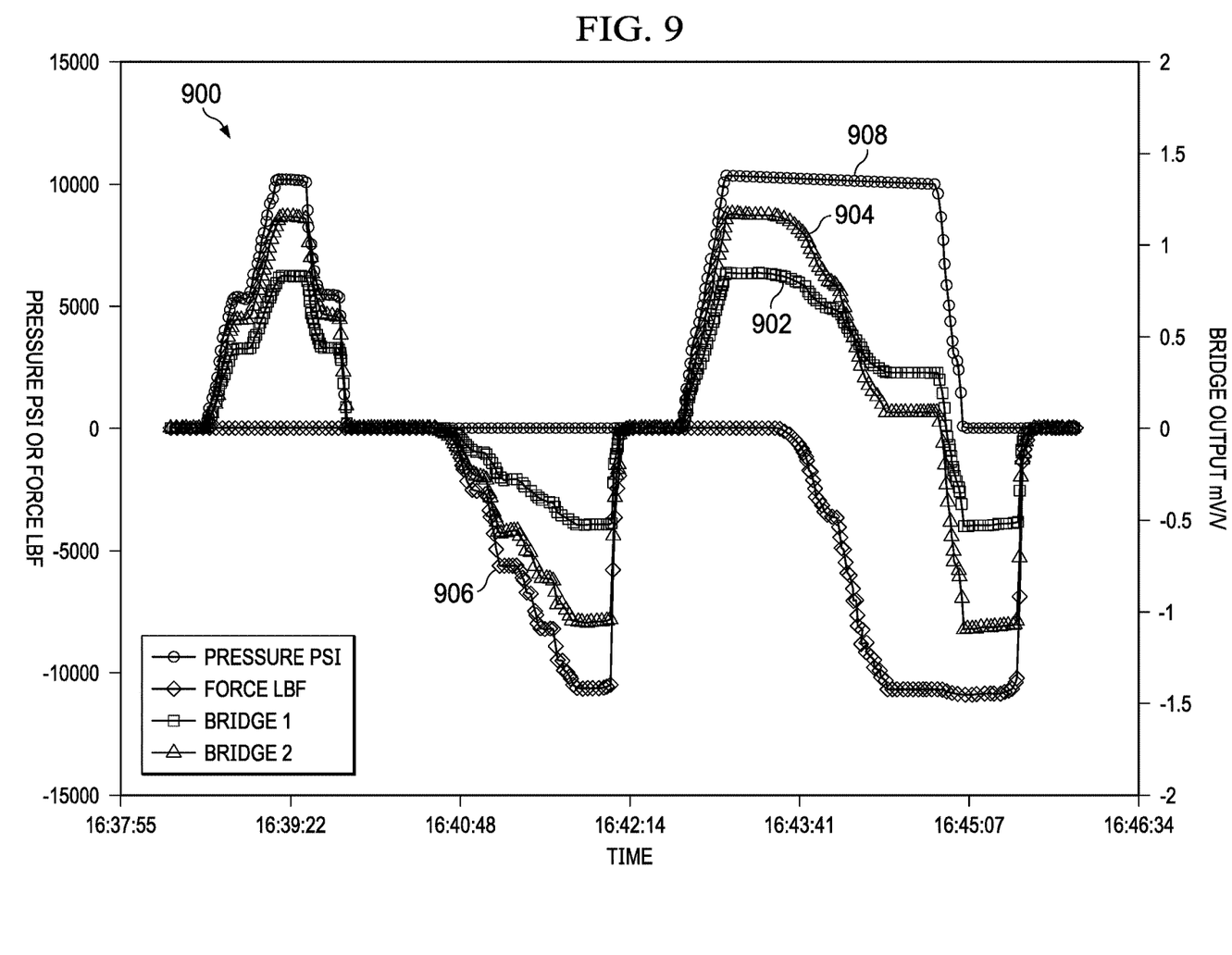
FIG. 9 is an exemplary chart of force and pressure calculated through the use of mathematical formulae using signals from strain sensors on strain sensitive regions of a load cell, according to an embodiment.

Referring to FIG. 9, a chart 900 of force and pressure over time may be created by calculating a change in force $\Delta F$ and a change in pressure $\Delta P$ using the calibration matrix and changes in output signals $\Delta S_1$ (902) and $\Delta S_2$ (904) of the first bridge and the second bridge respectively. Calculated force is illustrated as 906 and calculated pressure is illustrated as 908. The chart illustrates that changes in output signals relate to changes in force and pressure, and more specifically, force and pressure may be individually accounted for using the output signals from the first and the second bridge.

In an embodiment of the disclosed subject matter, an alarm may be triggered if one of a force or a pressure calculated using the calibration matrix meets or exceeds a set point. An example of an embodiment of the disclosed subject matter may comprise a force and pressure measurement on a cable used in a subsea application where these measurements may be critical for a survival of a tethered device.

In some embodiments, the measured force on the load cell may be as a result of one of the first end, the second end, or both the first end and the second end being opened or closed to the atmosphere.

It is to be understood that while certain aspects of the disclosed subject matter have been shown and described, the disclosed subject matter is not limited thereto and encompasses various other embodiments and aspects.

Insofar as the description above and the accompanying drawings disclose any additional subject matter that is not within the scope of the single claim below, the disclosed subject matter is not dedicated to the public and the right to file one or more applications to claim such additional inventions is reserved.

What is claimed is:

1. An axial force pressure transducer comprising:
a hollow cross section having a first strain sensitive region distinct from a second strain sensitive region; and
an electrical circuit comprising a first bridge and a second bridge that generate signals proportional to an axial and a circumferential strain on the first strain sensitive region and the second strain sensitive region, wherein a force and a pressure are calculated using an output signal of each of the first and second bridges.

2. The axial force pressure transducer of claim 1, wherein a change in the force and a change in the pressure are calculated as a dot product of a calibration matrix and a second matrix comprising a change in the output signal of the first bridge and a change in the output signal of the second bridge.

3. The axial force pressure transducer of claim 1, wherein a change in the force $\Delta F$ and a change in the pressure $\Delta P$ are calculated according to:

$$\begin{bmatrix} \frac{\partial F}{\partial Sig1} & \frac{\partial F}{\partial Sig2} \\ \frac{\partial P}{\partial Sig1} & \frac{\partial P}{\partial Sig2} \end{bmatrix} \cdot \begin{bmatrix} \Delta S_1 \\ \Delta S_2 \end{bmatrix} = \begin{bmatrix} \Delta F \\ \Delta P \end{bmatrix}$$

wherein $\Delta S_1$ is a change in the output signal of the first bridge, $\Delta S_2$ is a change in the output signal of the second bridge, and $$\begin{bmatrix} \frac{\partial F}{\partial Sig1} & \frac{\partial F}{\partial Sig2} \\ \frac{\partial P}{\partial Sig1} & \frac{\partial P}{\partial Sig2} \end{bmatrix}$$

is a calibration matrix.

4. The axial force pressure transducer of claim 3, wherein the output signal of the first bridge and the output signal of the second bridge are tared to zero when no force is applied to the cross section, and a measurement of the change in force is an actual force applied to the cross section.

5. The axial force pressure transducer of claim 3, wherein the output signal of the first bridge and the output signal of the second bridge are tared to zero when no pressure is applied to the cross section, and a measurement of the change in pre is an actual pressure applied to the cross section.

6. The axial force pressure transducer of claim 3, further comprising:
a first set of strain sensors comprising two axial strain gages and two circumferential strain gages and configured for electrical communication with the first bridge; and
a second set of strain sensors comprising two axial strain gages and two circumferential strain gages and configured for electrical communication with the second bridge.

7. The axial force pressure transducer of claim 6, wherein the two axial strain gages and the two circumferential strain gages of the first set of strain sensors comprise:
a first circumferential strain gage electrically coupled with a first junction of the first bridge and a second junction of the first bridge;
a first axial strain gage electrically coupled with the second junction of the first bridge and a third junction of the first bridge;
a second circumferential strain gage electrically coupled with the third junction of the first bridge and a fourth junction of the first bridge; and
a second axial strain gage electrically coupled with the fourth junction of the first bridge and the first junction of the first bridge.

8. The axial force pressure transducer of claim 7, wherein the two axial strain gages and the two circumferential strain gages of the second set of strain sensors comprise:
a first circumferential strain gage electrically coupled with a first junction of the second bridge and a second junction of the second bridge;
a first axial strain gage electrically coupled with the second junction of the second bridge and a third junction of the second bridge;
a second circumferential strain gage electrically coupled with the third junction of the second bridge and a fourth junction of the second bridge; and
a second axial strain gage electrically coupled with the fourth junction of the second bridge and the first junction of the second bridge.

9. The axial force pressure transducer of claim 8, further comprising:
a first terminal electrically coupled with the first junction of the first bridge;
a second terminal electrically coupled with the third junction of the first bridge;
a third terminal electrically coupled with the second junction of the first bridge;
a fourth terminal electrically coupled with the fourth junction of the first bridge;
a fifth terminal electrically coupled with the second junction of the second bridge; and
a sixth terminal electrically coupled with the fourth junction of the second bridge, the first junction of the first bridge electrically coupled with the first junction of the second bridge, and the third junction of the first bridge electrically coupled with the third junction of the second bridge, wherein when a voltage is applied across the first and second terminals, the output signal of the first bridge is obtained from the third and fourth terminals, and the output signal of the second bridge is obtained from the fifth and sixth terminals.

10. The axial force pressure transducer of claim 9, wherein the calibration matrix is an inverse of a sensitivity matrix:

$$\begin{bmatrix} \frac{\partial Sig1}{\partial F} & \frac{\partial Sig2}{\partial F} \\ \frac{\partial Sig1}{\partial P} & \frac{\partial Sig2}{\partial P} \end{bmatrix};$$

$$\frac{\partial Sig1}{\partial F}$$

is calculated by applying a first force to the cross section with no change in pressure and measuring the output signal of the first bridge and the output signal of the second bridge;

$$\frac{\partial Sig2}{\partial F}$$

is calculated by applying a second force to the cross section with no change in pressure and measuring the output signal of the first bridge and the output signal of the second bridge;

$$\frac{\partial Sig1}{\partial P}$$

is calculated by applying a first pressure to the cross section with no change in force and measuring the output signal of the first bridge and the output signal of the second bridge; and $$\frac{\partial Sig2}{\partial P}$$

is calculated by applying a second pressure to the cross section with no change in force and measuring the output signal of the first bridge and the output signal of the second bridge.

11. A method of measuring a force and a pressure, comprising:
  providing a hollow cross section comprising a first strain sensitive region distinct from a second strain sensitive region;
  providing an electrical circuit comprising a first bridge and a second bridge that generate signals proportional to an axial and a circumferential strain on the first strain sensitive region and the second strain sensitive region; and
  calculating a measurement of a force and a pressure using an output signal of each of the first and second bridges.

12. The method of claim 11, further comprising:
  measuring a change in the output signal of the first bridge;
  measuring a change in the output signal of the second bridge; and
  calculating a change in force and a change in pressure from a dot product of a calibration matrix and a second matrix comprising the change in the output signal of the first bridge and the change in the output signal of the second bridge.

13. The method of claim 11, further comprising:
  measuring a change in the output signal of the first bridge;
  measuring a change in the output signal of the second bridge; and
  calculating a change in force $\Delta F$ and a change in pressure $\Delta P$ according to:

$$\begin{bmatrix} \frac{\partial F}{\partial Sig1} & \frac{\partial F}{\partial Sig2} \\ \frac{\partial P}{\partial Sig1} & \frac{\partial P}{\partial Sig2} \end{bmatrix} \cdot \begin{bmatrix} \Delta S_1 \\ \Delta S_2 \end{bmatrix} = \begin{bmatrix} \Delta F \\ \Delta P \end{bmatrix}$$

wherein $\Delta S_1$ is the change in the output signal of the first bridge, $\Delta S_2$ is the change in the output signal of the second bridge, and $$\begin{bmatrix} \frac{\partial F}{\partial Sig1} & \frac{\partial F}{\partial Sig2} \\ \frac{\partial P}{\partial Sig1} & \frac{\partial P}{\partial Sig2} \end{bmatrix}$$

is a calibration matrix.

14. The method of claim 13, further comprising:
  taring the output signal of the first bridge and the output signal of the second bridge to zero when no force is applied to the cross section; and
  measuring an actual force applied to the cross section according to the change in force.

15. The method of claim 13, further comprising:
  taring the output signal of the first bridge and the output signal of the second bridge to zero when no pressure is applied to the cross section; and
  measuring an actual pressure applied to the cross section according to the change in pressure.

16. The method of claim 13, further comprising:
  providing a first of strain sensors configured for electrical communication with the first bridge and comprising two axial strain gages and two circumferential strain gages; and
  providing a second set of strain sensors configured for electrical communication with the second bridge and comprising two axial strain gages and two circumferential strain gages.

17. The method of claim 16, wherein the two axial strain gages and the two circumferential strain gages of the first set of strain sensors comprise a first circumferential strain gage electrically coupled with a first junction of the first bridge and a second junction of the first bridge, a first axial strain gage electrically coupled with the second junction of the first bridge and a third junction of the first bridge, a second circumferential strain gage electrically coupled with the third junction of the first bridge and a fourth junction of the first bridge, and a second axial strain gage electrically coupled with the fourth junction of the first bridge and the first junction of the first bridge.

18. The method of claim 17, wherein the two axial strain gages and the two circumferential strain gages of the second set of strain sensors comprise a first circumferential strain gage electrically coupled with a first junction of the second bridge and a second junction of the second bridge, a first axial strain gage electrically coupled with the second junction of the second bridge and a third junction of the second bridge, a second circumferential strain gage electrically coupled with the third junction of the second bridge and a fourth junction of the second bridge, and a second axial strain gage electrically coupled with the fourth junction of the second bridge and the first junction of the second bridge.

19. The method of claim 18, further comprising:
  applying a voltage across a first terminal and a second terminal;
  measuring the output signal of the first bridge from a third terminal and a fourth terminal; and
  measuring the output signal of the second bridge from a fifth terminal and a sixth terminal, the first terminal electrically coupled with the first junction of the first bridge, the second terminal electrically coupled with the third junction of the first bridge, the third terminal electrically coupled with the second junction of the first bridge, the fourth terminal electrically coupled with the fourth junction of the first bridge, the fifth terminal electrically coupled with the second junction of the second bridge, and the sixth terminal electrically coupled with the fourth junction of the second bridge, the first junction of the first bridge electrically coupled with the first junction of the second bridge, and the third junction of the first bridge electrically coupled with the third junction of the second bridge.

20. The method of claim 19, further comprising:
calculating the calibration matrix as the inverse of a sensitivity matrix:

$$\begin{bmatrix} \frac{\partial Sig1}{\partial F} & \frac{\partial Sig2}{\partial F} \\ \frac{\partial Sig1}{\partial P} & \frac{\partial Sig2}{\partial P} \end{bmatrix};$$

measuring the output signal of the first bridge and the output signal of the second bridge while applying a first force to the cross section with no change in pressure to calculate $$\frac{\partial Sig1}{\partial F};$$

measuring the output signal of the first bridge and the output signal of the second bridge while applying a second force to the cross section with no change in pressure to calculate $$\frac{\partial Sig2}{\partial F};$$

measuring the output signal of the first bridge and the output signal of the second bridge, while applying a first pressure to the cross section with no change in force to calculate $$\frac{\partial Sig1}{\partial P};$$

and measuring the output signal of the first bridge and the output signal of the second bridge, while applying a second pressure to the cross section with no change in force to calculate $$\frac{\partial Sig2}{\partial P}.$$

* * * * *